(12) United States Patent
Yoshinori et al.

(10) Patent No.: US 10,110,083 B2
(45) Date of Patent: Oct. 23, 2018

(54) STATOR OF ROTARY ELECTRIC MACHINE AND ROTARY ELECTRIC MACHINE

(71) Applicant: Mitsubishi Electric Corporation, Tokyo (JP)

(72) Inventors: Manabu Yoshinori, Tokyo (JP); Atsushi Sakaue, Tokyo (JP); Tatsuro Hino, Tokyo (JP); Hironori Tsuiki, Tokyo (JP); Shinichi Okada, Tokyo (JP); Hiroki Shiota, Tokyo (JP); Masaya Inoue, Tokyo (JP); Shogo Okamoto, Tokyo (JP); Shinji Nishimura, Tokyo (JP); Akira Hashimoto, Tokyo (JP); Shinkichi Sawa, Tokyo (JP); Yutaka Ikura, Tokyo (JP); Ryuichi Kitora, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 333 days.

(21) Appl. No.: 14/904,730

(22) PCT Filed: Nov. 8, 2013

(86) PCT No.: PCT/JP2013/080264
§ 371 (c)(1),
(2) Date: Jan. 13, 2016

(87) PCT Pub. No.: WO2015/068266
PCT Pub. Date: May 14, 2015

(65) Prior Publication Data
US 2016/0172921 A1    Jun. 16, 2016

(51) Int. Cl.
*H02K 3/34* (2006.01)
*H02K 1/16* (2006.01)
*H02K 3/28* (2006.01)
*H02K 15/12* (2006.01)

(52) U.S. Cl.
CPC ............ *H02K 3/34* (2013.01); *H02K 1/16* (2013.01); *H02K 1/165* (2013.01); *H02K 3/28* (2013.01); *H02K 3/345* (2013.01); *H02K 15/12* (2013.01)

(58) Field of Classification Search
CPC ............ H02K 1/16; H02K 1/165; H02K 3/28; H02K 3/34; H02K 1/27; H02K 1/276; H02K 1/28; H02K 3/345; H02K 15/12
(Continued)

(56) References Cited

U.S. PATENT DOCUMENTS

2009/0026872 A1*  1/2009  Tomohara .............. H02K 1/148
                                                          310/216.011
2010/0244615 A1*  9/2010  Kouda ..................... H02K 3/34
                                                          310/215
(Continued)

FOREIGN PATENT DOCUMENTS

JP    2004-236457 A    8/2004
JP    2009-213309 A    9/2009
(Continued)

OTHER PUBLICATIONS

International Search Report of PCT/JP2013/080264 dated Jan. 21, 2014.
(Continued)

*Primary Examiner* — Bernard Rojas
*Assistant Examiner* — Rashad Johnson
(74) *Attorney, Agent, or Firm* — Sughrue Mion, PLLC; Richard C. Turner

(57) ABSTRACT

A side surface at the outside of a plurality of teeth portions of one separated core is faced to a side surface of teeth portions of an adjacent separated core, so as to form a second slot which is straddled between the adjacent separated cores, and a first slot is formed by a plurality of teeth portions of
(Continued)

one separated core, and a width size of the first slot is identical to a width size of the second slot, and coil conductor storage space is formed in the first slot via a first insulating component, and coil conductor storage space is formed in the second slot via a second insulating component, and a thickness size of the first insulating component is different from a thickness size of the second insulating component.

4 Claims, 4 Drawing Sheets

(58) Field of Classification Search
USPC ................ 310/215, 154.07, 156.21, 198
See application file for complete search history.

(56) References Cited

U.S. PATENT DOCUMENTS

| | | | | |
|---|---|---|---|---|
| 2011/0148246 | A1* | 6/2011 | Mizutani | H02K 1/16 310/216.009 |
| 2012/0194028 | A1* | 8/2012 | Rhoads | H02K 3/34 310/215 |
| 2013/0076200 | A1* | 3/2013 | Jo | H02K 15/022 310/216.135 |
| 2013/0099604 | A1* | 4/2013 | Yu | H02K 1/148 310/43 |
| 2013/0320801 | A1* | 12/2013 | Takasaki | H02K 1/16 310/216.009 |
| 2015/0229189 | A1* | 8/2015 | Tsuiki | H02K 3/12 29/596 |

FOREIGN PATENT DOCUMENTS

| | | |
|---|---|---|
| JP | 2011-193699 A | 9/2011 |
| JP | 2012-44831 A | 3/2012 |

OTHER PUBLICATIONS

Communication dated Aug. 31, 2017, from the State Intellectual Property Office of the P.R.C., in counterpart Chinese application No. 201380080781.3.

* cited by examiner

STATOR OF ROTARY ELECTRIC MACHINE AND ROTARY ELECTRIC MACHINE

CROSS REFERENCE TO RELATED APPLICATIONS

This application is a National Stage of International Application No. PCT/JP2013/080264 filed Nov. 8, 2013, the contents of all of which is incorporated herein by reference in its entirety.

BACKGROUND OF THE INVENTION

Technical Field

The present invention relates to a stator of a rotary electric machine, which includes a stator core having an annular shape in which a plurality of separated cores are linked in a circumferential direction, and relates to the rotary electric machine including the stator.

Background Art

As known in a conventional art, it is required that a rotary electric machine, which is mounted in a vehicle such as a car, in particular, a rotary electric machine, which is used as a generator and a motor, has a small size and a high power. In a conventional rotary electric machine, there is a stator of a rotary electric machine which includes a stator core having an annular shape, in which a plurality of teeth portions, which are extended in an axis direction, and a plurality of slots, which are partitioned by the teeth portions, are provided at an inner circumference portion, and a multi-phase stator coil, such as a three-phase stator coil, including a coil conductor which is inserted to the slots of the stator core. In a case of the conventional stator of the rotary electric machine, when the coil conductor is inserted to the inside of the slots, for example, the coil conductor of the stator coil is set in annular shape on a jig, of which external diameter is smaller than an internal diameter of the stator core, and the external diameter of the jig is expanded after the coil conductor, which is set on the jig, is inserted to inside space of the stator core, whereby the coil conductor is inserted to the inside of each of the slots.

In a case of the above-described conventional stator of the rotary electric machine, when the coil conductor is inserted to the slots, it is required that a width size of the slots is larger than a width size of the coil conductor in order to smoothly insert the coil conductor to the slots, so that there has been a problem in that a space factor of the coil conductor, which is inserted to the slots, is reduced. Moreover, when a difference between the width size of the slots and the width size of the coil conductor is reduced, the coil conductor is not smoothly inserted to the slots, so that there has been a problem in that an insulating film of the coil conductor is damaged by an edge of the teeth portions in some cases.

Therefore, in a conventional art, as disclosed in Patent Document 1, a stator of a rotary electric machine, in which a plurality of separated cores are linked in a circumferential direction of the stator so as to configure a stator core having an annular shape, and the rotary electric machine including the stator are suggested. The stator of the rotary electric machine, which is disclosed in Patent Document 1, includes the stator core, in which the plurality of separated cores are arranged along a whole circumference in a circumferential direction and a plurality of the teeth portions for partitioning a plurality of slots, of which depth direction is identical to a diameter direction, in a circumferential direction are provided, and a stator coil in which a coil conductor is inserted to the slots.

In the conventional stator of the rotary electric machine which is disclosed in Patent Document 1, one separated core includes a core-back portion which composes a part of an outer circumference surface of the stator core, and two teeth portions which compose a part of an inner circumference portion of the stator core so as to be protruded from the core-back portion toward a central direction of the stator core. The two teeth portions, which are provided in one separated core, are faced and arranged in a circumferential direction of the stator core via a predetermined gap, and one slot is partitioned by the two faced teeth portions. In the following description, the slot, which is partitioned by the two faced teeth portions, is referred to as a first slot.

Moreover, when the stator core is configured by the plurality of separated cores, a teeth portion of one separated core in the two adjacent separated cores and a teeth portion of the other separated core in the two adjacent separated cores are faced each other, and one slot, which is straddled between the two adjacent separated cores, is partitioned. In the following description, the slot, which is straddled between the two adjacent separated cores so as to be partitioned, is referred to as a second slot. It is desirable that a width size of the second slot is smaller than a width size of the first slot.

In the conventional stator of the rotary electric machine which is disclosed in Patent Document 1, the stator coil is previously formed in an annular shape, and the two teeth portions are inserted between the coil conductors in such a way that the coil conductors of the stator coil are sandwiched by the two teeth portions of the separated cores, whereby the coil conductors are inserted to the first slot which is partitioned by one separated core. Moreover, in this case, although the coil conductors are inserted between the two adjacent separated cores, the second slot, which is straddled between the adjacent separated cores, is not previously partitioned at this timing, so that the coil conductors are easily inserted between the adjacent separated cores. As described above, after each of the teeth portions of the plurality of the separated cores is inserted between the coil conductors of the stator coil which is configured in an annular shape, each of the separated cores is integrally fixed so as to form the stator core having an annular shape. In a state where a plurality of the separated cores is mutually fixed in an annular shape, the second slot is partitioned by the teeth portions of the adjacent separated cores.

According to the conventional stator of the rotary electric machine and the rotary electric machine including the stator, which is configured as described above and disclosed in Patent Document 1, the width size of the second slot is smaller than the width size of the first slot, whereby a space factor of the coil conductors of the second slot can be increased, and a space factor of the coil conductors of the slots in the whole stator can be increased, and a rotary electric machine having a small size and a high power can be obtained. Moreover, because the coil conductors are inserted between the adjacent separated cores before the second slot, which is straddled between the adjacent separated cores, is partitioned, even when the width size of the second slot is smaller than the width size of the first slot, there is an advantage for reducing a fear in which an insulating film or the like of the coil conductors is damaged by the teeth portions when the coil conductors are inserted.

CONVENTIONAL ART DOCUMENT

Patent Document

Patent Document 1: Japanese Laid-Open Patent Publication No. 2009-213309

SUMMARY OF THE INVENTION

Problems to be Solved by the Invention

In the stator of the rotary electric machine, which is disclosed in Patent Document 1, the width size of the second slot, which is straddled between the adjacent separated cores so as to be partitioned, is less than or equal to the width size of the first slot, which is partitioned by one separated core, so that there have been problems in that a space factor of the coil conductors of the first slot is different from a space factor of the coil conductors of the second slot, and a magnetic imbalance is caused in the stator which is formed in such a way that a plurality of separated cores are linked in a circumferential direction.

The present invention has been made to solve the above-described problems in a conventional stator of a rotary electric machine, and an object of the invention is to provide a stator of a rotary electric machine and the rotary electric machine including the stator, in which a width size of slots of the stator is uniform, and a space factor is increased, and a magnetic imbalance is not caused.

Means for Solving Problems

A stator of a rotary electric machine of the present invention includes a stator core which is configured in an annular shape; and a stator coil in which coil conductors are installed to slots which are formed at an inner circumference portion of the stator core; wherein the stator core is configured in such a way that a plurality of separated cores are linked in a circumferential direction of the stator core; and the separated cores include core-back portions which include an outer circumference surface composing a part of an outer circumference surface of the stator core, a plurality of teeth portions which are protruded from the core-back portions toward the inside in the diameter direction of the stator core and arranged in a circumferential direction of the stator core via a predetermined gap, and a first slot which is partitioned by the plurality of teeth portions; and when the plurality of separated cores are linked in the circumferential direction of the stator core so as to configure the stator core, a side surface, which is positioned at the outside in the circumferential direction of the teeth portions of the separated cores, is faced to a side surface, which is positioned at the outside in circumferential direction of the teeth portions of the adjacent separated cores, so as to form a second slot, which is straddled between the adjacent separated cores; and a width size of the first slot is identical to a width size of the second slot; and the slots, which are formed at the inner circumference portion of the stator core, are composed of the first slot and the second slot; and the first slot installs the coil conductors via a first insulating component; and the second slot installs the coil conductors via a second insulating component of which thickness size is larger than a thickness size of the first insulating component.

A rotary electric machine of the present invention includes a stator core which is configured in an annular shape; and a stator coil in which coil conductors are installed to slots which are formed at an inner circumference portion of the stator core; wherein the stator core is configured in such a way that a plurality of separated cores are linked in a circumferential direction of the stator core; and the separated cores include core-back portions which include an outer circumference surface composing a part of an outer circumference surface of the stator core, a plurality of teeth portions which are protruded from the core-back portions toward the inside in the diameter direction of the stator core and arranged in a circumferential direction of the stator core via a predetermined gap, and a first slot which is partitioned by the plurality of teeth portions; and when the plurality of separated cores are linked in the circumferential direction of the stator core so as to configure the stator core, a side surface, which is positioned at the outside in the circumferential direction of the teeth portions of the separated cores, is faced to a side surface, which is positioned at the outside in circumferential direction of the teeth portions of the adjacent separated cores, so as to form a second slot which is straddled between the adjacent separated cores; and a width size of the first slot is identical to a width size of the second slot; and the slots, which are formed at the inner circumference portion of the stator core, are composed of the first slot and the second slot; and the first slot installs the coil conductors via a first insulating component; and the second slot installs the coil conductors via a second insulating component of which thickness size is larger than a thickness size of the first insulating component.

Effects of the Invention

According to a rotor of a rotary electric machine and the rotary electric machine including the rotor of the present invention, a width size of slots of a stator is uniform, and a space factor can be increased, and a magnetic imbalance can be removed.

MODE FOR CARRYING OUT THE INVENTION

Embodiment 1

Figure 1:
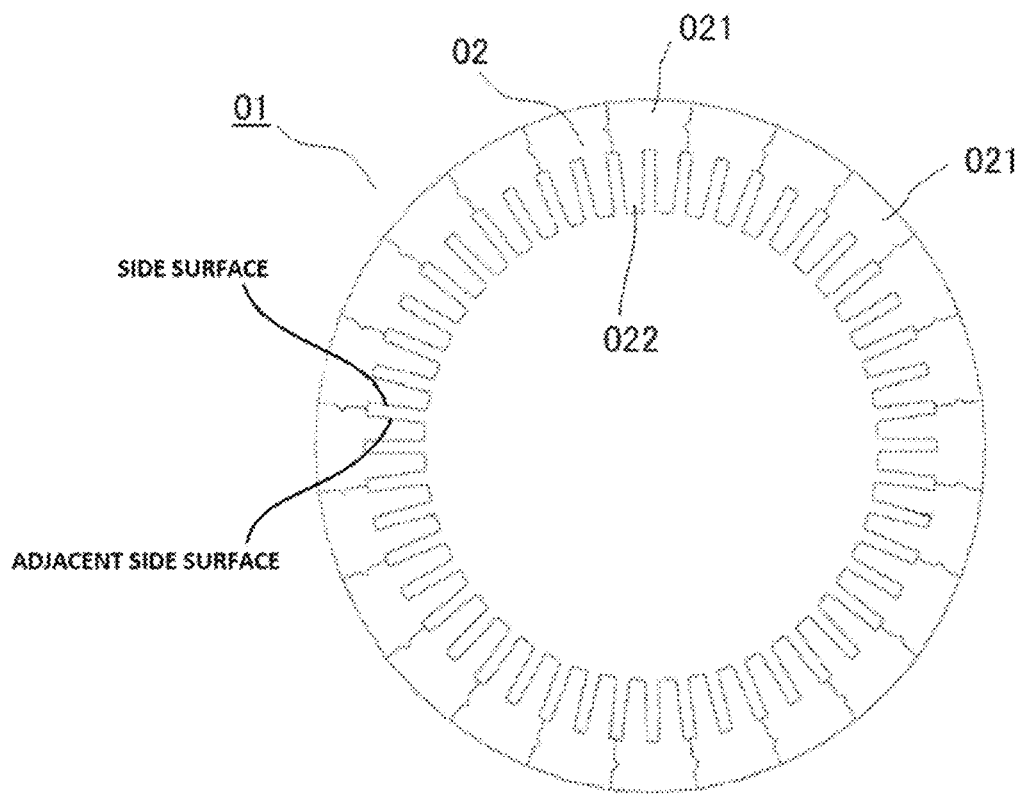
FIG. 1 is a cross-sectional view illustrating a stator core in a stator of a rotary electric machine according to Embodiment 1 of the present invention.
Figure 2:
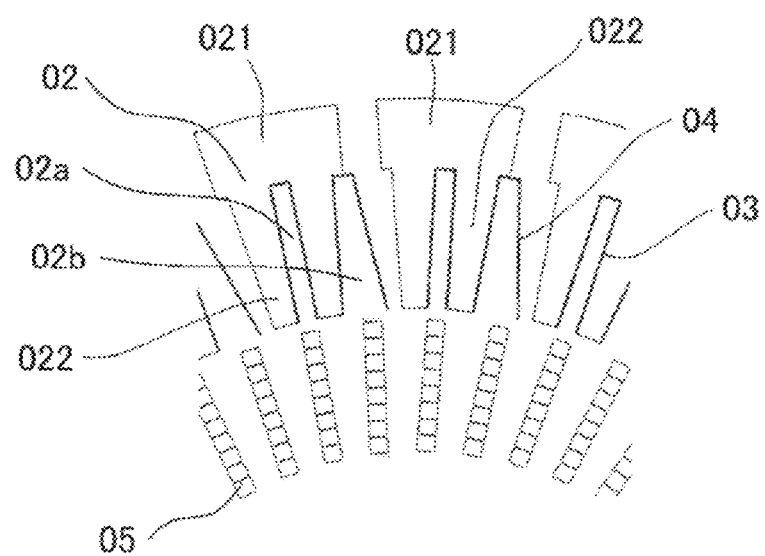
FIG. 2 is a partial cross-sectional view illustrating the stator of the rotary electric machine according to Embodiment 1 of the present invention.
Figure 4:
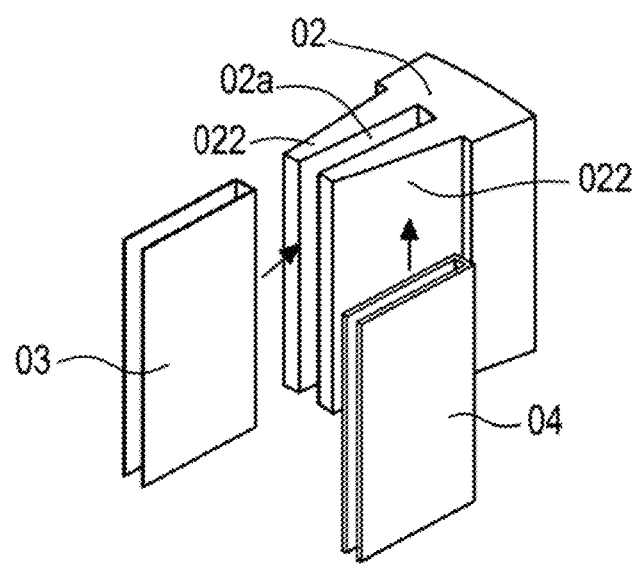
FIG. 4 is an oblique perspective view for explaining the separated cores in the stator of the rotary electric machine according to Embodiment 1 of the present invention.

FIG. 1 is a cross-sectional view illustrating a stator core in a stator of a rotary electric machine according to Embodiment 1 of the present invention, and FIG. 2 is a partial cross-sectional view illustrating the stator of the rotary electric machine according to Embodiment 1 of the present invention, and FIG. 4 is an oblique perspective view for explaining separated cores in the stator of the rotary electric machine according to Embodiment 1 of the present invention. In FIG. 1, a stator core 01 having an annular shape is configured in such a way that 24 separated cores 02 having an identical shape are linked in an annular shape in a circumferential direction of the stator core 01. Each of the separated cores 02 is formed in an identical shape.

The separated cores 02, which are clearly illustrated in FIG. 2 and FIG. 4, include core-back portions 021, which include an outer circumference surface composing a part of an outer circumference surface of the stator core 01, two teeth portions 022, which are protruded from the core-back portions 021 toward the inside in a diameter direction of the stator core 01 and arranged in a circumferential direction of the stator core 01 via a predetermined gap, and a first slot 02a, which is partitioned by the two teeth portions 022. In other words, the first slot 02a, which is partitioned by the two teeth portions 022 and has a shape being identical to a completed slot shape of the stator core 01, is formed at the separated cores 02.

Moreover, when a plurality of separated cores 02 are linked in a circumferential direction of the stator core 01 so as to configure the stator core 01, a side surface, which is positioned at the outside in a circumferential direction of the teeth portions 022 of each of the separated cores 02, is faced to a side surface, which is positioned at the outside in a circumferential direction of the teeth portions 022 of the adjacent separated cores 02, so as to form a second slot 02b which is straddled between the adjacent separated cores 02.

Specifically, protruded portions, of which width size is a roughly half size with respect to a width size of the first slot 02a, are formed at both end portions in a circumferential direction of the separated cores 02, and when the plurality of separated cores 02 are linked in a circumferential direction, the protruded portions, which are formed at the both end portions in a circumferential direction of the separated cores 02, are contacted to protruded portions in a circumferential direction of the adjacent separated cores 02, whereby one teeth portion 022 of the separated cores 02 is faced one teeth portion 022 of the adjacent separated cores 02 in a state where a width size of the teeth portion 022 is identical to the width size of the first slot 02a. As a result, the second slot 02b, of which width size is identical to the width size of the first slot 02a, is formed by the two teeth portions 022. As a result, the stator core 01 includes slots, which are composed of the first slot 02a and the second slot 02b, at an inner circumference portion of the stator core 01.

A first insulating component 03 is inserted to the first slot 02a of the stator core 01, and a second insulating component 04 is inserted to the second slot 02b of the stator core 1. The first insulating component 03 is bonded to an inner wall of the first slot 02a by a double-sided adhesive tape or the like, and the second insulating component 04 is bonded to the second slot 02b by a double-sided adhesive tape or the like. A thickness size of the second insulating component 04 is larger than a thickness size of the first insulating component 03.

When the stator is assembled, the plurality of separated cores 02 are inserted in a diameter direction of a stator coil having an annular shape from an outer circumference side of coil conductors 05 of the stator coil which is previously formed with a predetermined phase arrangement so as to be arranged in an annular shape, and then the core-back portions 021 of each of the separated cores 02 are integrally linked in a circumferential direction, whereby the stator is formed in an annular shape.

Figure 3:
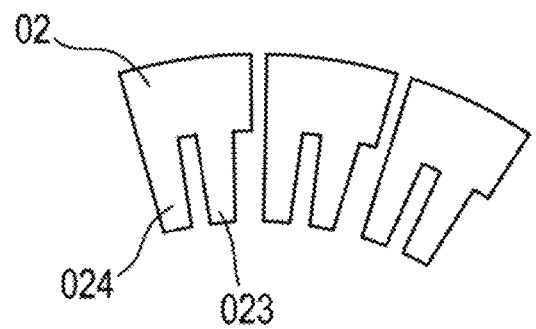
FIG. 3 is a partial cross-sectional view illustrating a deformation example of separated cores in the stator of the rotary electric machine according to Embodiment 1 of the present invention.

In addition, a shape of the separated cores 02 is not limited to a shape of the separated cores 02 which are illustrated in FIG. 1, FIG. 2 and FIG. 4. FIG. 3 is a partial cross-sectional view illustrating a deformation example of the separated cores in the stator of the rotary electric machine according to Embodiment 1 of the present invention. As illustrated in FIG. 3, the separated cores 02 may be formed in such a way that two teeth portions 023 and 024, of which shapes are different from each other, are protruded from the core-back portions 021 side. In other words, one teeth portion 024 is formed in such a way that one side surface of the teeth portion 024 is linearly linked to a side surface of an end portion of the core-back portions 021, and the other side surface of the teeth portion 024 is faced to a side surface of the other one teeth portion 023 via a gap having a predetermined slot width size. Moreover, the other side surface of the teeth portion 023 is formed in such a way that the other side surface is positioned at the inside separated from the end portion of the core-back portions 021 with the predetermined slot width size. Therefore, as illustrated in FIG. 3, the separated cores 02 in the deformation example have a shape in which both ends are asymmetrical. The separated cores 02 are linked in an annular shape, whereby the slots, which have a uniform width size, can be formed.

Figure 5:
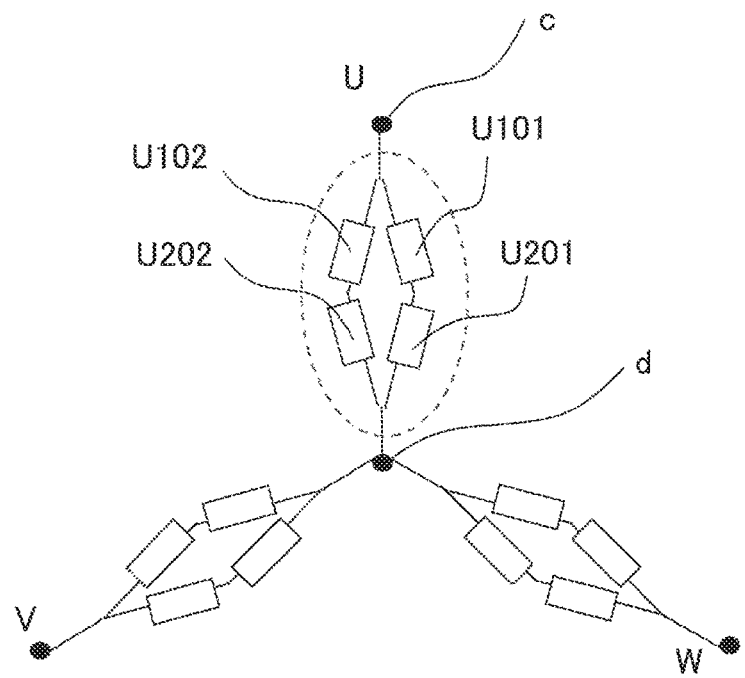
FIG. 5 is a connection diagram illustrating a stator coil in the stator of the rotary electric machine according to Embodiment 1 of the present invention.

Hereinafter, a connection of the stator coil will be explained by using a 48 slot-8 pole-3 phase rotary electric machine. FIG. 5 is a connection diagram illustrating the stator coil in the stator of the rotary electric machine according to Embodiment 1 of the present invention. In FIG. 5, a number of the slots corresponding to each pole and each phase is two, and in a case of a U-phase, a coil group U101 and U201 is connected in series, and a coil group U102 and U202 is connected in series, and then these coil groups, which are connected in series, are connected in parallel. In this case, half coils in coils, which are inserted to the slots along one circumference, are defined as a first coil group. Therefore, two coil groups are inserted into each of the slots.

Figure 6:
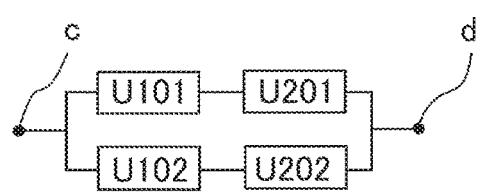
FIG. 6 is an explanatory view illustrating the stator coil corresponding to one phase in the stator of the rotary electric machine according to Embodiment 1 of the present invention.

FIG. 6 is an explanatory view illustrating the stator coil corresponding to one phase in the stator of the rotary electric machine according to Embodiment 1 of the present invention. As illustrated in FIG. 6, a coil group U101 and U102 of the U-phase is connected to a feeding portion "c", and a coil group U201 and U202 of the U-phase is connected to a neutral point "ad". Coil groups are similarly connected in a V-phase and a W-phase.

Figure 7:
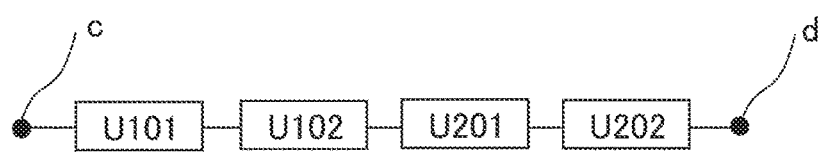
FIG. 7 is an explanatory view illustrating a deformation example of the stator coil corresponding to one phase in the stator of the rotary electric machine according to Embodiment 1 of the present invention.
Figure 8:
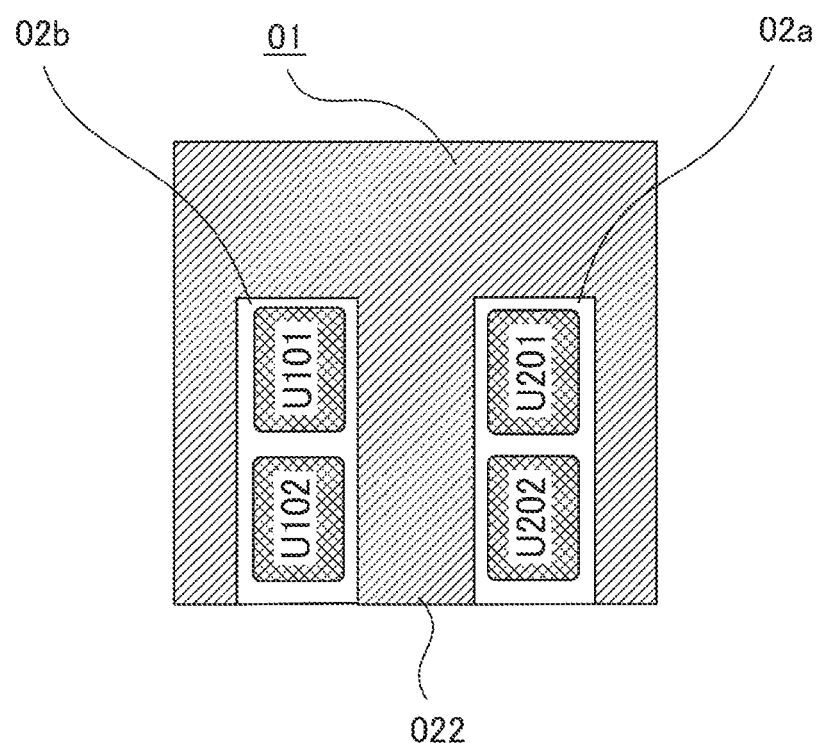
FIG. 8 is an enlarged cross-sectional view illustrating a part of the stator core in the stator of the rotary electric machine according to Embodiment 1 of the present invention.

FIG. 7 is an explanatory view illustrating a deformation example of the stator coil corresponding to one phase in the stator of the rotary electric machine according to Embodiment 1 of the present invention. As illustrated in FIG. 7, the feeding portion "c", the coil group U101, U102, U201, and U202, and the neutral point "ad" may be sequentially connected. Moreover, a sequence of the coil group U101 and U102 may be changed, and a sequence of the coil group U201 and U202 may be similarly changed. As illustrated in FIG. 8, the coil group U101 and U102 is inserted to the second slot 02b of the stator core 01, and the coil group U201 and U202 is inserted to the first slot 02a of the stator core 01.

FIG. 8 is an enlarged cross-sectional view illustrating a part of the stator core in the stator of the rotary electric machine according to Embodiment 1 of the present invention, In FIG. 8, the coil group U201 and U202, which is adjacent to the neutral point "d", is inserted to the first slot 02a, and the coil group U101 and U102, which is adjacent to the feeding portion "c", is inserted to the second slot 02b. Therefore, a potential difference between the coils in the slots can be reduced, and moreover, an insulating film of the coil group U201 and U202 can be thinned. Moreover, a potential difference between the coil group U201 and U202 and the stator core 01 can be reduced, so that an insulating film to ground can be thinned at each of the slots. The insulating film can be similarly thinned in the other phases except the U-phase.

As described above, the thickness size of the second insulating component 04, which is inserted to the second slot 02b, is larger than the thickness size of the first insulating component 03, which is inserted to the first slot 02a, and the width of the first slot 02a is equal to the width of the second slot 02b, so that a space factor can be increased, and a magnetic imbalance can be removed.

In a case where the width of the first slot 02a is equal to the width of the second slot 02b, the second slot 02b is configured by the sequential slots of the separated cores 02 when the stator core 01 is attached to the coil conductors 05, so that a slot width, which is widened before the separated cores 02 are inserted to the coil conductors 05, is narrowed while the separated cores 02 are inserted, and the separated cores 02 are easily inserted. However, the width of the first slot 02a, which is partitioned between the separated cores 02, cannot be widened, and it is desirable that the width size of the first slot 02a is roughly equivalent to the width size of the coil in order to increase a space factor, so that there has been a problem in that an attachment workability for attaching the separated cores 02 to the coil conductors 05 is reduced. However, the thickness of the first insulating component. 03, which is inserted to the first slot 02a which is partitioned between the separated cores 02, is thin, so that the separated cores 02 can be easily inserted to the coil conductors 05. Moreover, it can be realized that the thickness size of the first insulating component 03 is a roughly half size with respect to the thickness size of the second insulating component 04, so that the attachment workability for attaching the separated cores 02 to the coil conductors 05 can be improved.

In addition, in the scope of the present invention, it is possible that the embodiment is suitably modified or omitted.

INDUSTRIAL APPLICABILITY

The present invention can be applied in a field of a rotary electric machine, and can be particularly applied in a field of a rotary electric machine which is mounted in a vehicle, and can be applied in a vehicle industry or the like.

DESCRIPTION OF THE SYMBOLS

"01" is a stator core; "02," separated cores; "02a, " a first slot; "02b, " a second slot; "022, 023, and 024," teeth portions; "03", a first insulating component; "04," a second insulating component; "05," coil conductors; "c," a feeding portion; "d," a neutral point; "U101, U102, U201, and U202," coil groups.

What is claimed is:
1. A stator of a rotary electric machine, comprising:
a stator core which is configured in an annular shape; and
a stator coil in which coil conductors are installed to slots which are formed at an inner circumference portion of the stator core; wherein
the stator core is configured in such a way that a plurality of separated cores are linked in a circumferential direction of the stator core; and
the separated cores include
core-back portions which include an outer circumference surface composing a part of an outer circumference surface of the stator core,
a plurality of teeth portions which are protruded from the core-back portions toward the inside in a diameter direction of the stator core and arranged in the circumferential direction of the stator core via a predetermined gap, and
a first slot which is partitioned by the plurality of teeth portions; and
when the plurality of separated cores are linked in the circumferential direction of the stator core so as to configure the stator core, a side surface, which is positioned at the outside in the circumferential direction of the teeth portions of the separated cores, is faced to an adjacent side surface, which is positioned at the outside in the circumferential direction of the teeth portions of the adjacent separated cores, so as to form a second slot which is straddled between the adjacent separated cores; and
a width size of the first slot is identical to a width size of the second slot; and
the slots, which are formed at the inner circumference portion of the stator core, are composed of the first slot and the second slot; and
the first slot installs the coil conductors via a first insulating component; and
the second slot installs the coil conductors via a second insulating component of which thickness size is larger than a thickness size of the first insulating component.

2. A stator of a rotary electric machine according to claim 1, wherein the stator core is configured in such a way that a slot number corresponding to each pole and each phase is greater than or equal to two; and in the stator coil, the coil conductors, which are adjacent to a feeding portion, are installed to the second slot, and the coil conductors, which are adjacent to a neutral point, are installed to the first slot.

3. A stator of a rotary electric machine according to claim 1, wherein the thickness size of the first insulating component is a roughly half size with respect to the thickness size of the second insulating component.

4. A rotary electric machine which includes the stator of the rotary electric machine according to claim 1.

* * * * *